(12) United States Patent
Zeng et al.

(10) Patent No.: US 7,061,777 B2
(45) Date of Patent: Jun. 13, 2006

(54) INPUT STAGE CIRCUIT OF THREE-LEVEL DC/DC CONVERTER

(75) Inventors: Jianhong Zeng, Taoyuan Hsien (TW);
Jianping Ying, Taoyuan Hsien (TW);
Xiaojun Deng, Taoyuan Hsien (TW);
Xingkuan Guo, Taoyuan Hsien (TW);
Aiming Xiong, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/907,831

(22) Filed: Apr. 18, 2005

(65) Prior Publication Data

US 2006/0050537 A1    Mar. 9, 2006

(30) Foreign Application Priority Data

Sep. 9, 2004    (TW) ............... 93127238 A

(51) Int. Cl.
*H02M 3/335*    (2006.01)
*H02M 7/538*    (2006.01)

(52) U.S. Cl. .................... 363/17; 363/25; 363/134

(58) Field of Classification Search ................ 363/17, 363/24, 25, 56.06, 62, 133, 134
See application file for complete search history.

(56) References Cited

U.S. PATENT DOCUMENTS

| 4,860,184 | A | * | 8/1989 | Tabisz et al. ............... 363/17 |
| 5,808,879 | A | * | 9/1998 | Liu et al. .................... 363/17 |
| 6,349,044 | B1 | * | 2/2002 | Canales-Abarca et al. .... 363/17 |
| 6,353,547 | B1 | * | 3/2002 | Jang et al. ................ 363/132 |
| 6,487,092 | B1 | * | 11/2002 | Nishikawa ................. 363/17 |

* cited by examiner

*Primary Examiner*—Adolf Berhane
(74) *Attorney, Agent, or Firm*—Jianq Chyun IP Office

(57) ABSTRACT

An input stage circuit of a three-level DC/DC converter is provided. The input stage circuit uses metal-oxide-semiconductor field effect transistors (MOSFETs) to discharge a flying capacitor to maintain the voltage across the flying capacitor at a half of the input voltage. Not only can the input stage circuit solve the high voltage issue across the flying capacitor in the prior art, but the circuit is able to operate normally without increasing power consumption during discharging, thereby avoiding problems of the prior art.

12 Claims, 8 Drawing Sheets

US 7,061,777 B2

INPUT STAGE CIRCUIT OF THREE-LEVEL DC/DC CONVERTER

CROSS REFERENCE TO RELATED APPLICATION

This application claims the priority benefit of Taiwan application Ser. No. 93,127,238, filed on Sep. 9, 2004. All disclosure of the Taiwan application is incorporated herein by reference.

BACKGROUND OF THE INVENTION

1. Field of the Invention

The present invention relates to a DC/DC converter, and more particularly, to an input stage circuit of a three-level DC/DC converter.

2. Description of the Related Art

Three-level DC/DC converters with zero-voltage-switching (ZVS) have been adapted for various high-voltage and high-power applications, such as telecommunication systems, battery chargers, and uninterruptible power supply systems. The advantage is low power consumption and high efficiency.

FIG. 1 is a schematic drawing showing a conventional three-level DC/DC converter. The three-level DC/DC converter comprises an input stage circuit 101, a transformer T, and an output stage circuit 102. Wherein the input stage circuit 101 is coupled to the primary side of the transformer T, comprising an input voltage Vin, voltage-dividing capacitors C1 and C2, freewheeling diodes D1 and D2, a flying capacitor C3, metal-oxide-semiconductor filed effect transistors (MOSFETs) Qa, Qb, Qc, and Qd serving as switch apparatuses, and an oscillation inductor Lg. The output stage circuit 102 is coupled to a secondary side of the transformer T, comprising an output rectifying circuit composed of rectifying diodes D3 and D4, and an output filter circuit composed of a filter capacitor Co and a filter inductor Lo.

In the operating theory of the three-level DC/DC converter, these switch apparatuses Qa–Qd are used to control directions of currents flowing through the primary side of the transformer T so that a direct current is converted to an alternating current. Through the output rectifying circuit, an alternating current outputted from the secondary side is converted to a direct current. That's the way the DC/DC converter transforms DC voltage. The turn-on or turn-off states of these MOSFETs Qa–Qd can be controlled by driving signals outputted from phase-shift full bridge control chips (not shown), such as UCC3875 or UCC3895.

Under normal operation, the voltage across the flying capacitor C3 should be maintained at a half of the input voltage Vin. With slight loading or without loading under an open-loop control or close-loop control situation, the voltage across the flying capacitor C3 usually is larger than a half of the input voltage Vin. For example, when the input voltage Vin is 400 V, the voltage across the flying capacitor C3 can reach 250 V.

Under an open-loop control situation, the high voltage across the flying capacitor C3 results from the over—100% phase shift of the driving signal outputted from the control chip as shown in FIG. 2. Wherein, $V_{gs}$ represents the gate-to-source voltage of the MOSFETs, $V_{ab}$ represents the voltage drop between the points a and b in FIG. 1, $i_p$ represents the current flowing through the oscillation inductor Lg shown in FIG. 1, and $V_{ds}$ represents the drain-to-source voltage of the MOSFETs. Referring to FIG. 2, driving signals of the leading bridges Qd and Qc are behind driving signals of the lagging bridges Qa and Qb. Under this circumstance, Qa and Qb become leading bridges. The following is a description of events with respect to several important time periods.

During the period between t0 and t2, the MOSFETs Qa and Qd are turned on and the voltage drop between the points a and b are positive.

During the period between t1 and t2, the MOSFET Qa is turned off before the MOSFET Qd. The primary current of the transformer T flows through the flying capacitor C3 for conversion. The flying capacitor C3 is charged.

During the period between t2 and t3, after the MOSFET Qd is turned off, parasitic capacitors of the MOSFETs Qd and Qa are charged. A parasitic capacitor of the MOSEFT Qc is discharged. The flying capacitor C3 is charged.

During the period between t4 and t5, the sum of the voltage of the MOSFETs Qd and Qa is up to be equal to the input voltage Vin. The voltage across the MOSFETs Qc and Qb are 0. The flying capacitor C3 is charged.

During the period between t5 and t6, the MOSFET Qb is turned on. The current of the transformer T flows to the power source.

After t6, the MOSFET Qc is turned on. The transformer T receives a reverse voltage.

During the conversion, the flying capacitor C3 is always charged and thus has a high voltage. Moreover, the flying capacitor C3 cannot be discharged through the freewheeling diode D1 to the power source.

With light loading or without loading, the high voltage across the flying capacitor C3 results from the unbalance of charging and discharging. FIG. 3A is a configuration showing an equivalent charging circuit of the flying capacitor C3. FIG. 3B is a configuration showing an equivalent discharging circuit of the flying capacitor C3. In FIGS. 3A and 3B, the parameters of these equivalent circuits are different. The parasitic capacitance of the lagging bridge is usually smaller than that of the leading bridge, such that charges received from the charging are more than those lost due to discharging. Accordingly, the voltage across the flying capacitor C3 is undesirably high.

Due to the high voltage across the flying capacitor C3, voltage applied to these MOSFETs becomes unbalanced. Sometimes these MOSFETs would break down and damage the circuits. A solution is using a resistor or a transient voltage suppressor (TVS) connected in parallel to the flying capacitor C3 such that the voltage across the flying capacitor C3 can be maintained at a half of the input voltage Vin. The resistor, however, consumes power, and the value of resistance is hard to be determined. If the resistance is too small or too large, the resistor will adversely affect or even disrupt the operation of the circuit. When using the TVS, the TVS may break down and generate a big surge current when the voltage across the flying capacitor C3 is higher than the suppressing capacity of the TVS. This will undermine the operation of the circuit, and the TVS will completely consume the energy of the discharging.

Accordingly, a better method is desired to solve the issue of the high voltage across the flying capacitor C3 and avoid the disadvantages of the prior technology.

SUMMARY OF THE INVENTION

Accordingly, the present invention is directed to an input stage circuit of a three-level DC/DC converter to solve the high voltage issue across the flying capacitor without affecting the operation of the circuit and increasing power consumption during discharging.

In order to achieve the objects described above, the present invention discloses an input stage circuit of a three-level DC/DC converter, which is coupled to a primary side of a transformer. The input stage circuit comprises a positive input terminal, a negative input terminal, a first switch module, a second switch module, a first voltage-dividing capacitor, a second voltage-dividing capacitor, a flying capacitor, a pair of freewheeling diodes, and a discharging module. The positive input terminal and the negative input terminal are coupled to an input voltage. The first switch module is coupled between the positive input terminal and a first terminal of the primary side, controlling the connection and disconnection between the input voltage and the transformer. The second switch module is coupled between the negative input terminal and the first terminal of the primary side, controlling the connection and disconnection between the input voltage and the transformer. The first voltage-dividing capacitor is coupled between the positive input terminal and a second terminal of the primary side. The second voltage-dividing capacitor is coupled between the negative input terminal and the second terminal of the primary side. The flying capacitor is coupled between the first switch module and the second switch module. The pair of freewheeling diodes are respectively coupled between two terminals of the flying capacitor and the second terminal of the primary side. The second terminal of the primary side is coupled to the fist voltage-dividing capacitor and the second voltage-dividing capacitor. The discharging module is coupled between the flying capacitor and the second terminal of the primary side, discharging the flying capacitor.

According to a preferred embodiment of the present invention, the input stage circuit of a three-level DC/DC converter uses the discharging module composed of metal-oxide-semiconductor field effect transistors (MOSFETs) to discharge the flying capacitor. Not only can the voltage across the flying capacitor be maintained at a desired value, but the circuit normally operates without power consumption. Accordingly, the high voltage issue across the prior art flying capacitor can be solved, while avoiding other problems in the prior art technology.

The above and other features of the present invention will be better understood from the following detailed description of the preferred embodiments of the invention that is provided in conjunction with the accompanying drawings.

DESCRIPTION OF SOME EMBODIMENTS

The following is a description of an input stage circuit of a three-level DC/DC converter according to an embodiment of the present invention.

Figure 1:
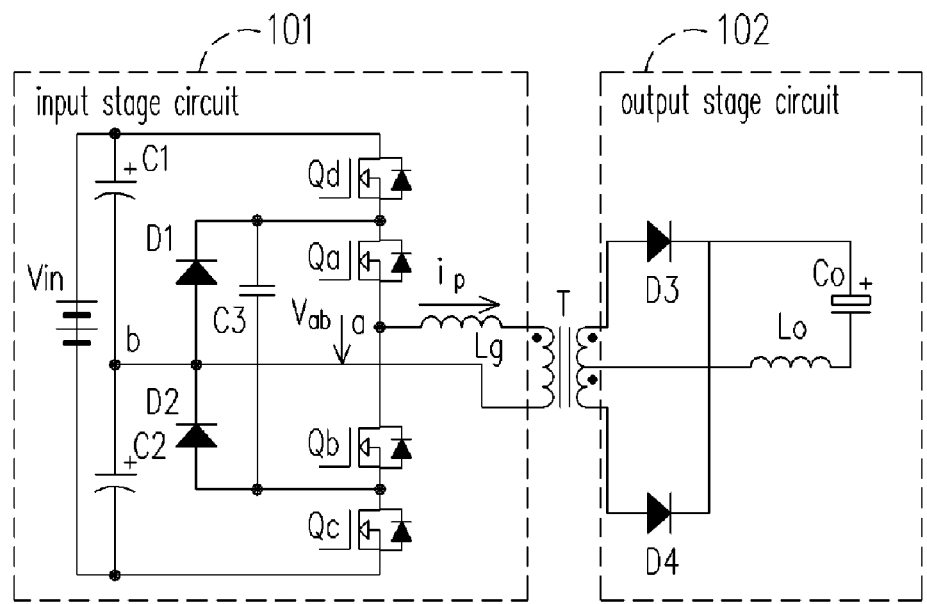
FIG. 1 is a schematic drawing showing a conventional three-level DC/DC converter.
Figure 2:
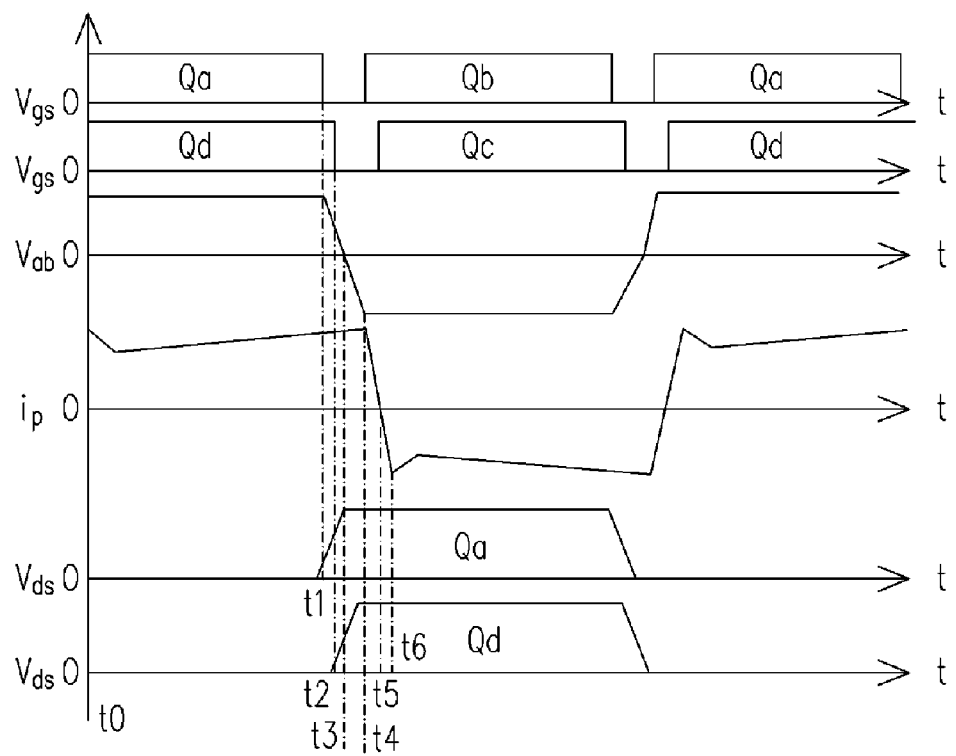
FIG. 2 is a configuration showing a signal sequence of the driving signals with over 100% phase shift of the MOSFETs according to a prior art technology.
Figure 3A:
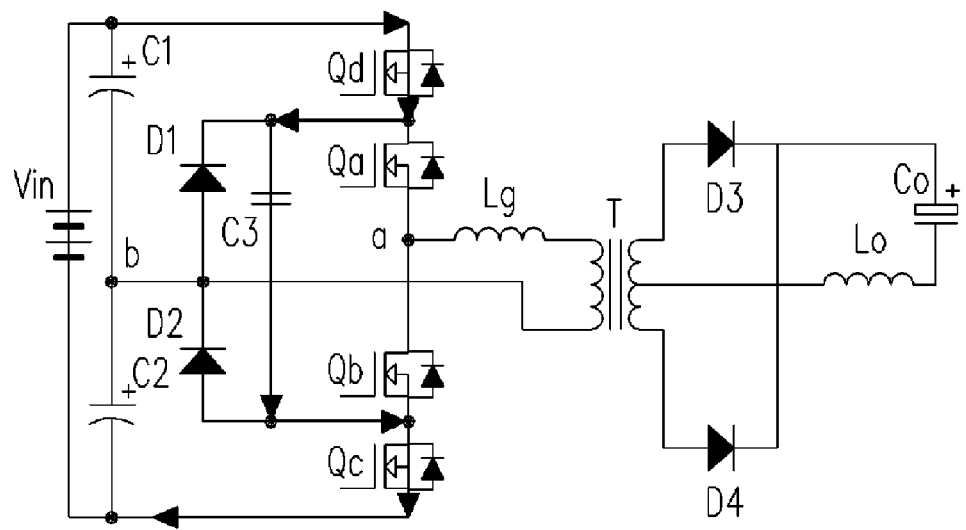
FIG. 3A is a configuration showing an equivalent charging circuit of the flying capacitor C3 in a conventional three-level DC/DC converter.
Figure 3B:
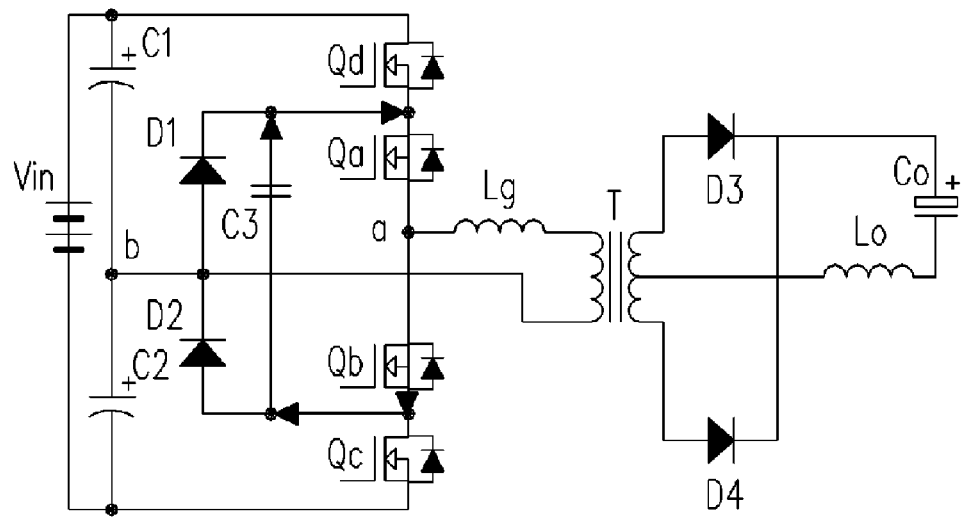
FIG. 3B is a configuration showing an equivalent discharging circuit of the flying capacitor C3 in a conventional three-level DC/DC converter.
Figure 4:
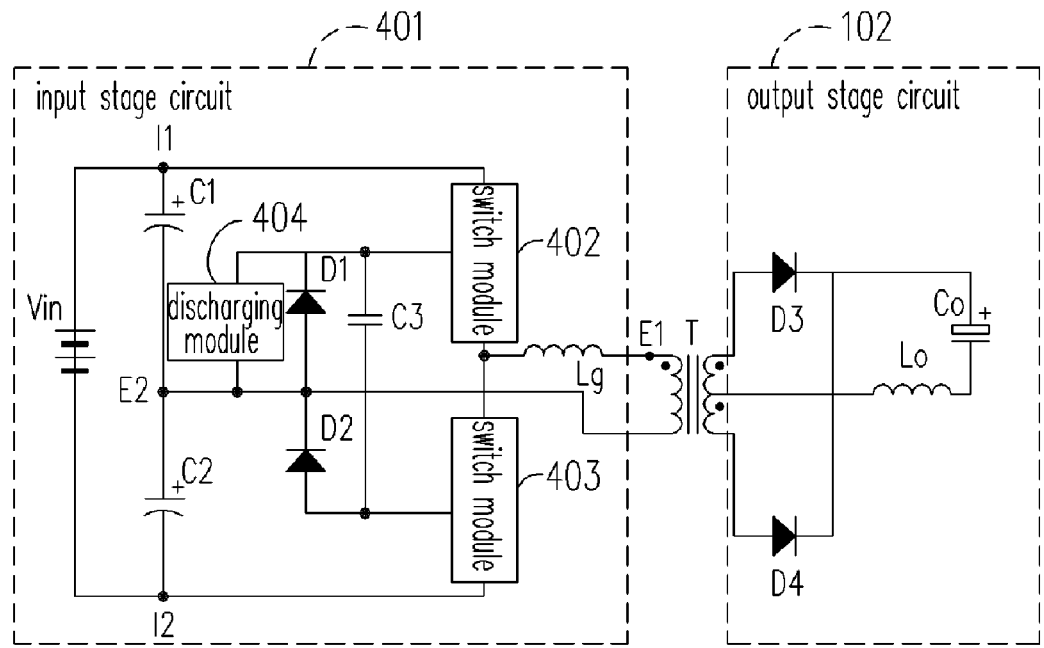
FIG. 4 is a schematic configuration showing a three-level DC/DC converter according to an embodiment of the present invention.

FIG. 4 is a schematic configuration showing a three-level DC/DC converter according to an embodiment of the present invention. Wherein, the left side of the transformer T is the primary side, which is coupled to the input stage circuit 401 of the present embodiment. The right side of the transformer T is the secondary side, which is coupled to the output stage circuit 102 as shown in FIG. 1.

The input stage circuit 401 comprises several devices. The positive input terminal 11 and the negative input terminal 12 are coupled to the input voltage Vin. The switch module 402 is coupled between the positive input terminal 11 and the first terminal El of the primary side. The switch module 403 is coupled between the negative input terminal 12 and the first terminal El of the primary side. Both switch modules control the connection and disconnection between the input voltage Vin and the transformer T. The voltage-dividing capacitor C1 is coupled between the positive input terminal 11 and the second terminal E2 of the primary side. The voltage-dividing capacitor C2 is coupled between the negative input terminal 12 and the second terminal E2 of the primary side. Both voltage-dividing capacitors are used to equally divide the input voltage Vin. The flying capacitor C3 is coupled between the switch modules 402 and 403. The freewheeling diodes D1 and D2 are respectively coupled between two terminals of the flying capacitor C3 and the second terminal E2 of the primary side. The discharging module 404 is coupled between the flying capacitor C3 and the second terminal E2 of the primary side to discharge the flying capacitor C3.

Figure 5:
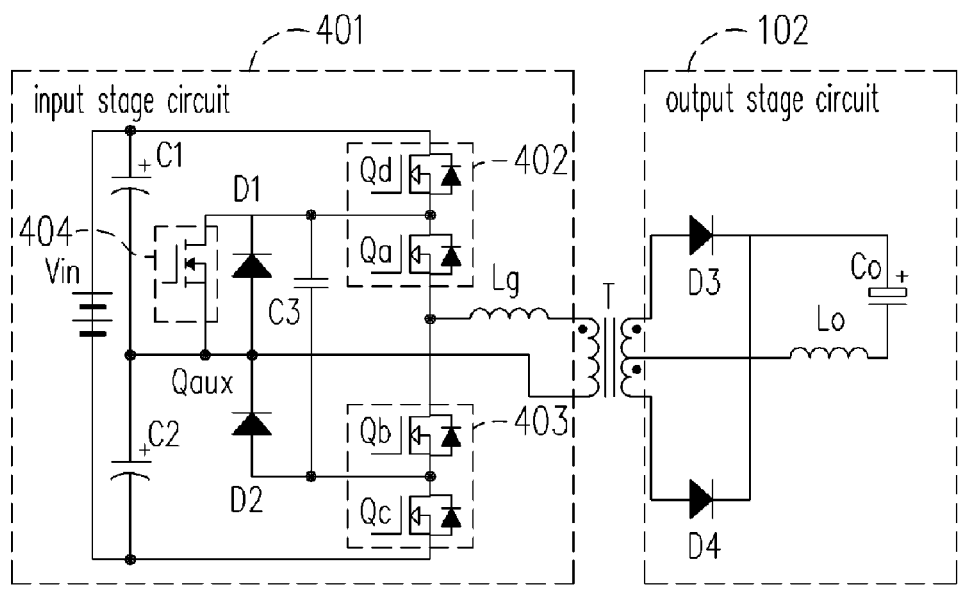
FIG. 5 is a circuit configuration showing a three-level DC/DC converter according to an embodiment of the present invention.

FIG. 5 is a detailed circuit configuration of FIG. 4. Wherein, the switch module 402 comprises two switch apparatuses connected in series; i.e., metal-oxide-semiconductor filed effect transistors (MOSFETs) Qa and Qd. The switch module 403 also comprises two switch apparatuses connected in series; i.e., MOSFETs Qb and Qc. The discharging module 404 comprises a MOSFET Qaux. Connections of other devices are similar to those described in FIG. 4.

Figure 6:
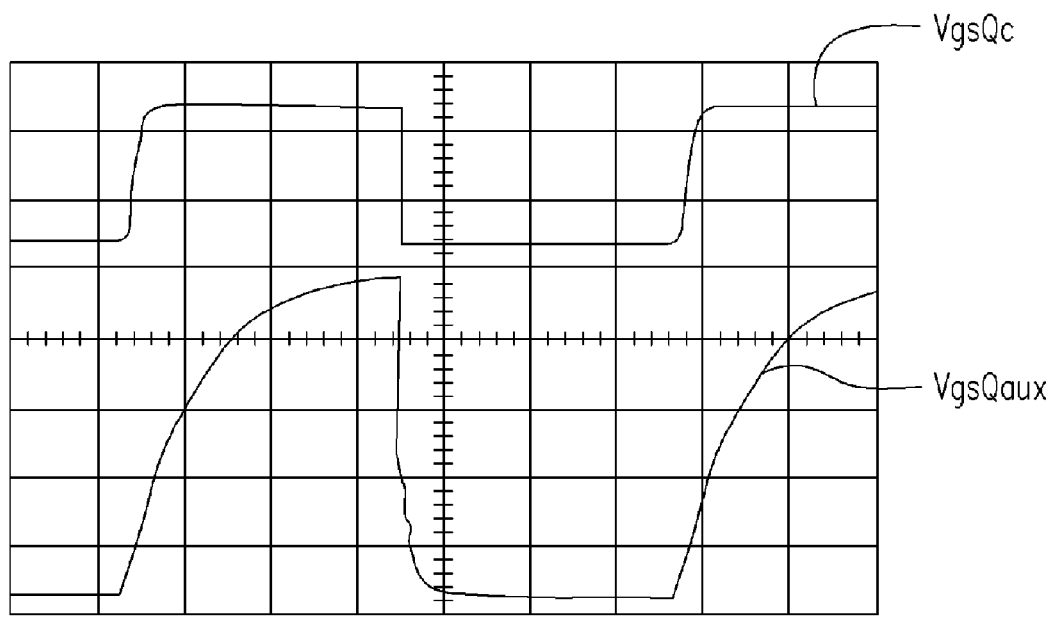
FIG. 6 is a configuration showing a sequence of the driving signals of the MOSFETs of a discharging module according to an embodiment of the present invention.

In this embodiment, the low-power MOSFET Quax is used to discharge the flying capacitor C3, whose driving signal and that of the MOSFET Qc are roughly synchronized. The turn-on state of the MOSFET Quax is a little slower than that of the MOSFET Qc to achieve zero voltage switching (ZVS). The turn-off state of the MOSFET Quax is a little earlier than that of the MOSFET Qc to achieve zero current switching (ZCS). The driving signals of the MOSFETs Qaux and Qc are compared in FIG. 6. Wherein $V_{gsQaux}$ represents the gate-to-source voltage of the MOSFET Qaux, and $V_{gsQc}$ represents the gate-to-source voltage of the MOSFET Qc. The charges stored in the flying capacitor C3 are fully discharged to the voltage-dividing capacitor C2 through the MOSFET Qaux. The control method is so simple and so reliable that the operation of the other parts of the converter will not be affected.

The operation of the present embodiment is described in the following.

Turn-on: After Qc is turned on, the voltage across the MOSFET Qc is 0. The voltage across the MOSFET Qaux is the voltage across the flying capacitor C3 minus the voltage across the voltage-dividing capacitor C2. At this moment, the MOSFET Qaux is turned on and the charges of the flying capacitor C3 are discharged to the power source. If the voltage across the flying capacitor C3 can discharge to reach a half of the input voltage Vin in time, extra amount of charges will not be accumulated in the flying capacitor C3. Accordingly, the voltage across the MOSFET Qaux is 0, that is, ZVS.

Turn-off: Before the MOSFET Qc is turned off, the current flows through MOSFETs Qb and Qc, without flowing through MOSFET Qaux. The MOSFET Qaux is turned off slightly earlier to achieve ZCS. Before the MOSFET Qaux is turned off, the flying capacitor C3 is already fully discharged.

Figure 7:
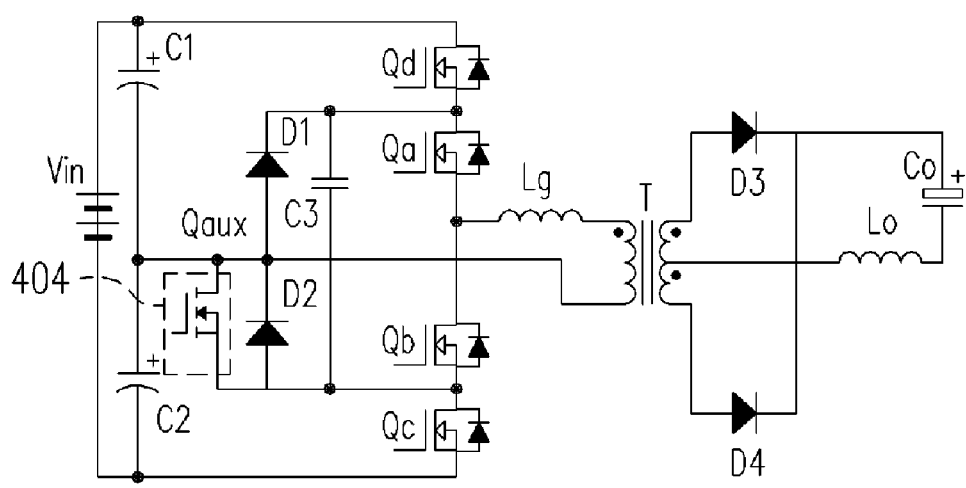
FIGS. 7–14 are schematic drawings showing three-level DC/DC converters according to other embodiments of the present invention.
Figure 8:
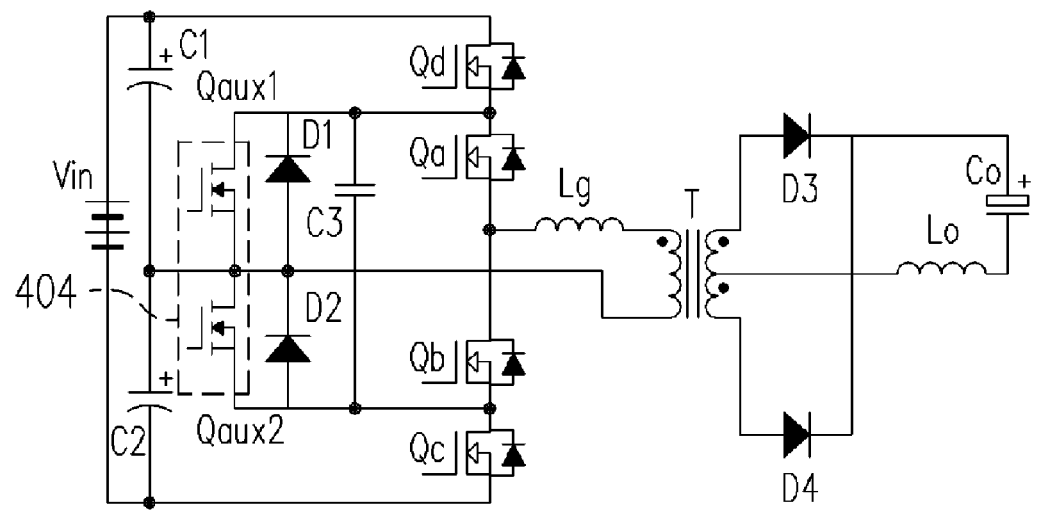

FIG. 7 is a schematic configuration showing a three-level DC/DC converter according to another embodiment of the present invention. It is an equivalent circuit of the previous embodiment. Compared with FIG. 5, the difference is that the MOSFET Qaux of the discharging module 404 is disposed on the other side of the flying capacitor C3 in FIG. 7. Connections of the other devices are the same as those of FIG. 5. The MOSFETs Qaux and Qd are synchronized, instead of Qc. The driving methods of Qaux and Qd are the same as those of Qaux and Qc, respectively, in the previous embodiment. FIG. 8 is the third embodiment of the present invention. In this embodiment, the discharging module 404 uses two MOSFETs Qaux1 and Qaux2, which correspond to MOSFETs Qaux in FIGS. 5 and 7, respectively. Connections of the other devices are the same as those of FIG. 5 or 7.

Figure 9:
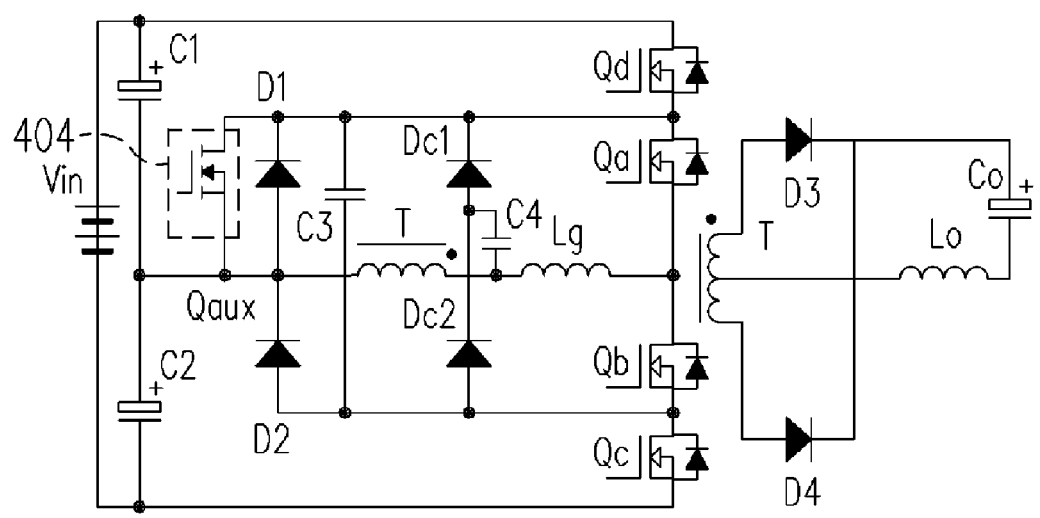
Figure 10:
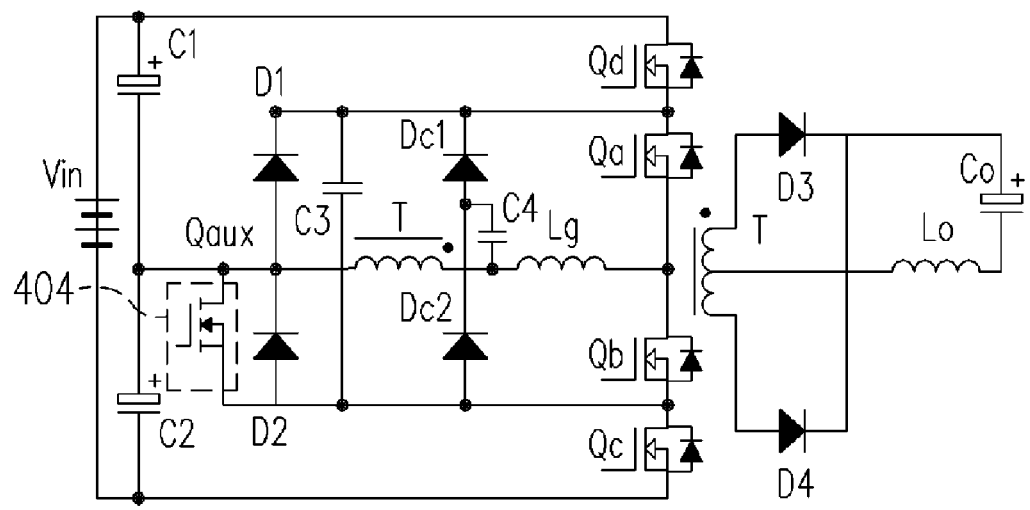
Figure 11:
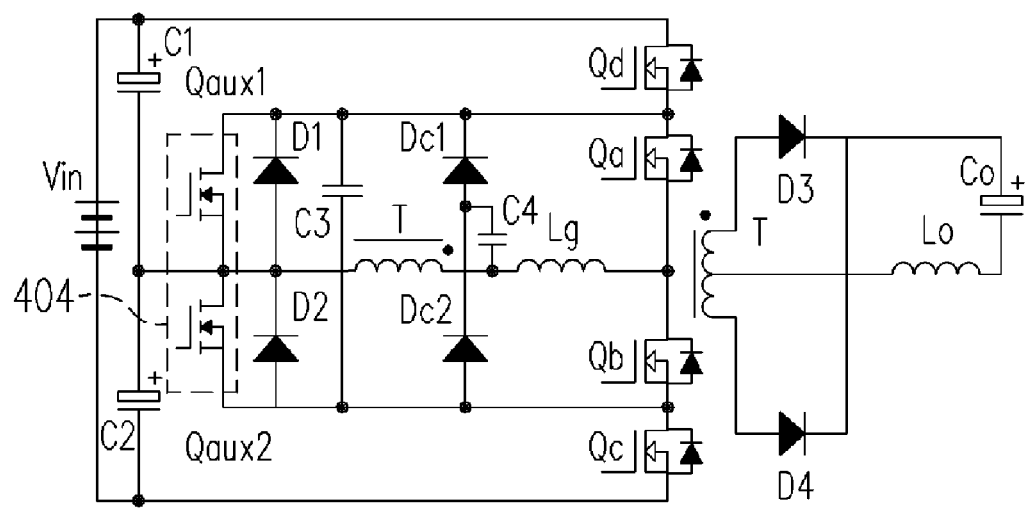

In addition to the input stage circuits in the last three embodiments, an active clamp technique can be used in this present invention. Three embodiments applying the active clamp technique are shown in FIGS. 9–11. In the active clamp technique, as shown in the FIGs, a clamp capacitor C4 and two clamp diodes Dc1 and Dc2 are added to the input stage circuits in the last three embodiments. Except for the clamp capacitor C4 and these clamp diodes Dc1 and Dc2, the embodiments of FIGS. 9–11 are the same as those in FIGS. 5, 7 and 8, respectively.

Figure 12:
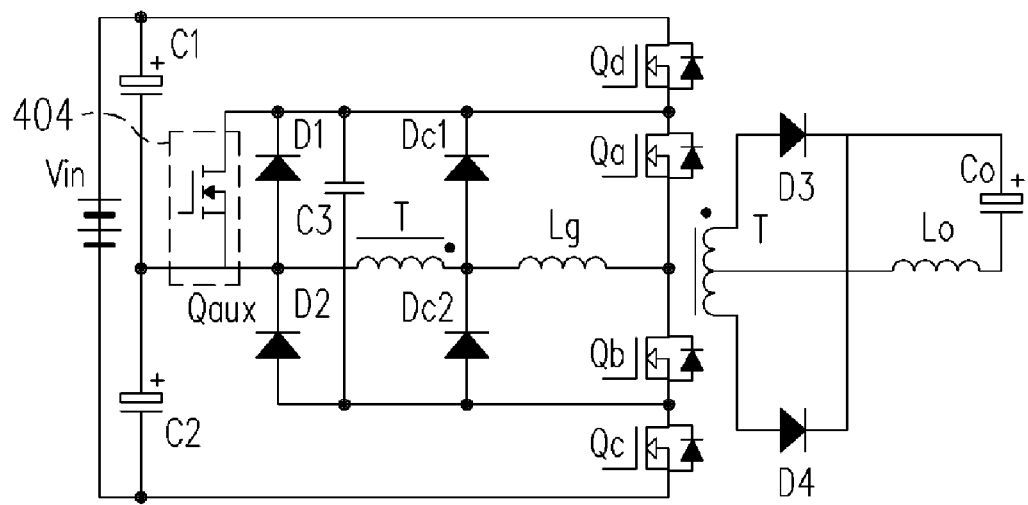
Figure 13:
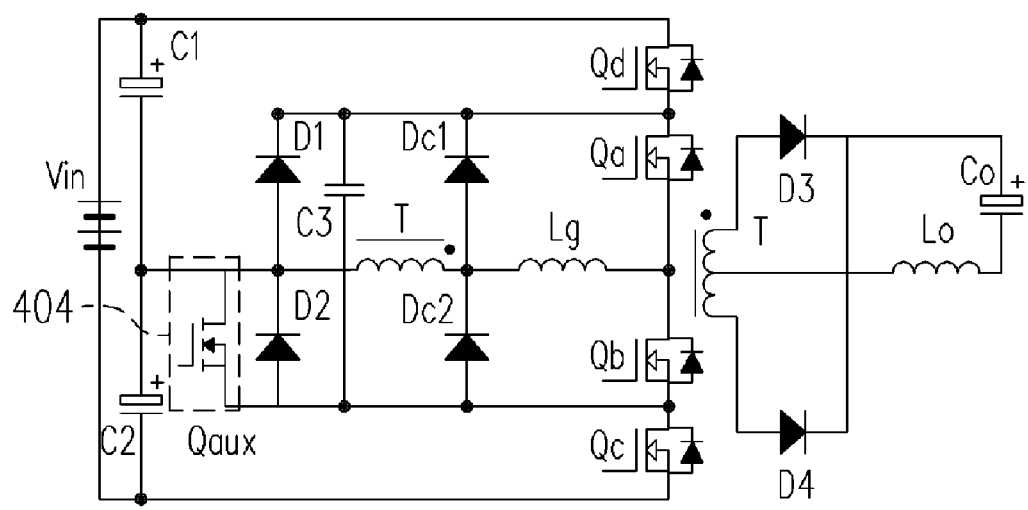
Figure 14:
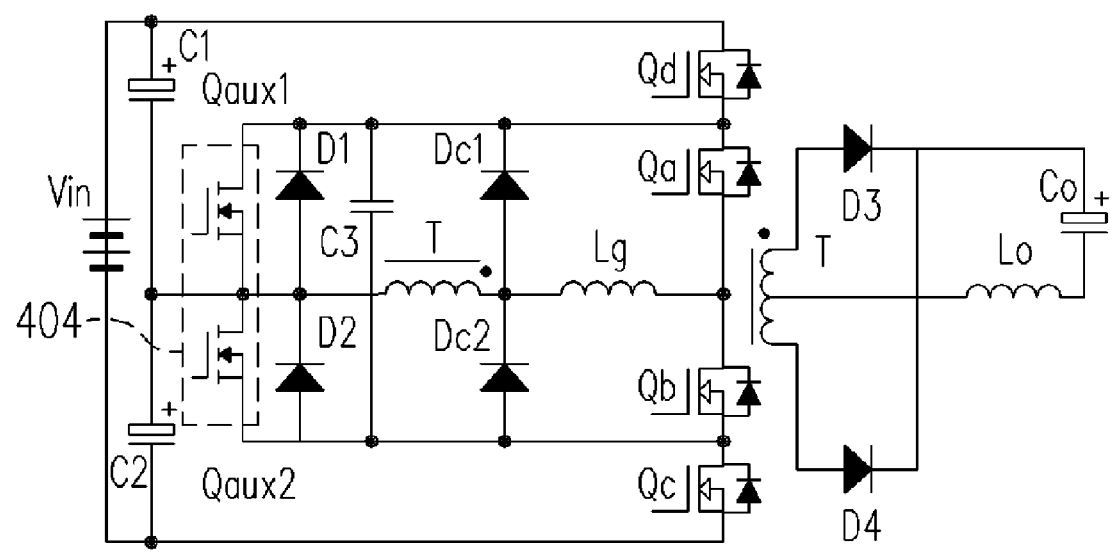

In addition to these six embodiments described above, another active clamp technique can be used to add more variation to these circuits. FIGS. 12–14 show three embodiments with another active clamp technique. Compared with the previous active clamp technique, this active clamp technique does not include the clamp capacitor C4. Except for the clamp diodes Dc1 and Dc2, the embodiments of FIGS. 12–14 are the same as those in FIGS. 5, 7 and 8, respectively.

According to these embodiments of the present invention, the input stage circuit of a three-level DC/DC converter, uses the discharging module composed of metal-oxide-semiconductor field effect transistors (MOSFETs) to discharge the flying capacitor. Not only can the voltage across the flying capacitor be maintained a half of the input voltage, but the circuit is able to operate normally without increasing power consumption during discharging. Accordingly, the high voltage issue across the prior art flying capacitor can be solved, while avoiding other disadvantages of the prior art.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. An input stage circuit of a three-level DC/DC converter, coupled to a primary side of a transformer, comprising:
   a positive input terminal and a negative input terminal, coupled to an input voltage;
   a first switch module, coupled between the positive input terminal and a first terminal of the primary side, controlling the connection and disconnection between the input voltage and the transformer;
   a second switch module, coupled to the negative input terminal and the first terminal of the primary side, controlling the connection and disconnection between the input voltage and the transformer;
   a first voltage-dividing capacitor, coupled between the positive input terminal and a second terminal of the primary side;
   a second voltage-dividing capacitor, coupled between the negative input terminal and the second terminal of the primary side;
   a flying capacitor, coupled between the first switch module and the second switch module;
   a pair of freewheeling diodes, respectively coupled between the two terminals of the flying capacitor, and the second terminal of the primary side; and
   a discharging module, coupled between the flying capacitor and the second terminal of the primary side, discharging the flying capacitor.

2. The input stage circuit of a three-level DC/DC converter of claim 1, wherein each of the first switch module and the second switch module comprises a plurality of switch apparatuses connected in series.

3. The input stage circuit of a three-level DC/DC converter of claim 2, wherein each of the switch apparatuses is a metal-oxide-semiconductor field effect transistor (MOSFET).

4. The input stage circuit of a three-level DC/DC converter of claim 2, wherein the first switch module comprises two switch apparatuses, and the second switch module comprises two switch apparatuses.

5. The input stage circuit of a three-level DC/DC converter of claim 1, wherein the discharging module comprises a MOSFET coupled between the flying capacitor and the second terminal of the primary side.

6. The input stage circuit of a three-level DC/DC converter of claim 1, wherein the discharging module comprises a pair of MOSFETs respectively coupled between the two terminals of the flying capacitor, and the second terminal of the primary side.

7. The input stage circuit of a three-level DC/DC converter of claim 1, the input stage circuit further comprising: a pair of clamp diodes, respectively coupled between the two terminals of the flying capacitor, and the first terminal of the primary side.

8. The input stage circuit of a three-level DC/DC converter of claim 7, wherein the discharging module further comprises: a MOSFET coupled between the flying capacitor and the second terminal of the primary side.

9. The input stage circuit of a three-level DC/DC converter of claim 7, wherein the discharging module further comprises: a pair of MOSFETs respectively coupled between the two terminals of the flying capacitor, and the second terminal of the primary side.

10. The input stage circuit of a three-level DC/DC converter of claim 7, wherein the clamp diodes are coupled to the first terminal of the primary side through a clamp capacitor.

11. The input stage circuit of a three-level DC/DC converter of claim 10, wherein the discharging module further comprises: a MOSFET coupled between the flying capacitor and the second terminal of the primary side.

12. The input stage circuit of a three-level DC/DC converter of claim 10, wherein the discharging module further comprises: a pair of MOSFETs respectively coupled between the two terminals of the flying capacitor, and the second terminal of the primary side.

* * * * *